United States Patent [19]

Sénès et al.

[11] 3,985,681

[45] Oct. 12, 1976

[54] CATALYST FOR THE OXIDATION OF AMMONIA

[75] Inventors: Michel Sénès, LaBaule; Michel Pottier; Jean-Francois Courdier, both of Saint Nazaire, all of France

[73] Assignee: Societe Chimique de la Grande Paroisse, Azote et Produits Chimiques, Paris, France

[22] Filed: Aug. 16, 1974

[21] Appl. No.: 498,228

Related U.S. Application Data

[63] Continuation-in-part of Ser. No. 316,541, Dec. 19, 1972, abandoned.

[30] Foreign Application Priority Data

June 15, 1972 France ............................ 72.21544

[52] U.S. Cl. ................................ 252/462; 252/469; 252/471; 252/472; 252/473; 423/404
[51] Int. Cl.² ..................... B01J 23/10; B01J 23/78; B01J 23/82; B01J 23/84
[58] Field of Search ............ 252/462, 472, 469, 471, 252/473; 423/403, 404, 405

[56] References Cited
UNITED STATES PATENTS

| 1,207,706 | 12/1916 | Bosch et al. | 423/404 |
|---|---|---|---|
| 1,207,707 | 12/1916 | Bosch et al. | 423/404 |
| 1,211,394 | 1/1917 | Bosch et al. | 423/404 |
| 1,919,005 | 7/1933 | Bray | 423/404 |
| 2,570,882 | 10/1951 | Stiles | 252/472 X |
| 3,767,772 | 10/1973 | Geus et al. | 423/404 |
| 3,888,792 | 6/1975 | Hughes | 252/462 |

FOREIGN PATENTS OR APPLICATIONS

| 704,407 | 12/1971 | South Africa | 423/404 |

Primary Examiner—W. J. Shine
Attorney, Agent, or Firm—Browdy and Neimark

[57] ABSTRACT

There are provided oxidation catalysts having a specific surface ranging from 12 to 100 m²/g and containing as their main constituent either an oxide of cobalt or an oxide of bismuth. The catalysts further contain a promoter in the form of a rare earth oxide or thorium oxide, and they may also contain at least one oxide of manganese, iron, magnesium, chromium or niobium. Such catalytic compositions can be used for the oxidation of ammonia in a solid bed or in a fluidized bed.

14 Claims, No Drawings

CATALYST FOR THE OXIDATION OF AMMONIA

CROSS-REFERENCE TO RELATED APPLICATION

The present application is a continuation-in-part of U.S. application, Ser. No. 316,541, filed Dec. 19, 1972, now abandoned.

BACKGROUND OF THE INVENTION

This invention relates to the catalytic oxidation of ammonia to oxides of nitrogen, notably nitric oxide, from which there can be produced nitric acid.

The nitric acid industry conventionally utilizes a catalyst which comprises pure platinum or a mixture of the pure metals obtained from platinum ore and which is in the form of a cloth or gauze, the thickness of the filaments of the cloth or gauze varying between a few centimeters and a few tenths of a millimeter. It is known that selectivity plays an important part in this type of ammonia oxidation; with the known catalysts the difficulty arises as to how to vary the selectivity, due to the employment of the catalyst as an extremely thin layer represented by the thickness of the cloths.

It is an object of the present invention to provide a catalytic composition which enables these difficulties to be overcome.

It is another object of the invention to provide a process for the catalytic oxidation of ammonia using a higher ammonia flow rate.

SUMMARY OF THE INVENTION

According to one aspect of the present invention there is provided a catalytic composition, suitable for use in the catalytic oxidation of ammonia to oxides of nitrogen, comprising at least 80% by weight of a metal oxide selected from the group consisting of cobalt oxide and bismuth oxide, said catalytic composition having a specific surface ranging from 12 to 100 $m^2g$. The catalytic compositions of the invention are thermally, mechanically and structurally stable and possess a high degree of hardness which resists attrition. The novel catalytic compositions of the invention have a degree of thermal stability such that their utilization at high temperatures between, say, 800 and 1000° C is possible without structural transformation or loss of mechanical strength.

The catalytic compositions of the invention also have the advantage that they permit the use, for the same quantity of active catalytic material, of an ammonia flow rate which is higher than is the case with conventional platinum cloths or gauzes. Such flow rates may be as much as 12 times higher than the conventional flow rates. Furthermore, the operating temperature can be decreased by approximately 100° C as compared with the operating temperature using platinum cloths. The catalytic compositions of the invention make it possible to employ high volumetric velocities, especially in a solid bed, whilst at the same time effecting the oxidation reaction within a wide pressure range with yields which are satisfactory at pressures up to 20 bars.

According to another aspect of the invention there is provided a process for the catalytic oxidation of ammonia in a solid bed wherein a reaction mixture comprising ammonia and air which is optionally enriched with oxygen, the ratio of ammonia to ammonia and air being in the range 0.05 to 0.12, is passed at a volumetric velocity ranging from 20,000 to 200,000 N liters/hour, per liter of catalyst, under an absolute pressure in the range of from 1 bar to 20 bars and at a mixture temperature of the order of 50° to 200° C, over a catalytic composition comprising at least 80% by weight of a metal oxide selected from the group consisting of cobalt oxide and bismuth oxide, said catalytic composition having a specific surface ranging from 12 to 100 $m^2g$.

According to a further aspect of the invention there is provided a process for the catalytic oxidation of ammonia in a fluidized bed wherein the process is carried into effect in said fluidized bed under an absolute pressure in the range of from 1 bar to 20 bars, wherein a reaction mixture comprising ammonia and air is introduced into a catalytic composition in the form of catalytic particles having a grain size in the range of from 50 to 700 microns at a mixture temperature in the range of from 50° to 200° C the volumetric velocity on the fluidized bed ranging from 50 to 2000 N liters per hour per liter of catalyst, the ratio of ammonia to ammonia and air in the reaction mixture being in the range of 0.05 to 0.12 and the catalytic composition comprising at least 80% by weight of a metal oxide selected from the group consisting of cobalt oxide and bismuth oxide, said catalytic composition having a specific surface ranging from 12 to 100 $m^2/g$.

It has been discovered that the addition of promoters to the catalytic compositions of the invention is particularly advantageous. Such promoters can be selected from the group consisting of the oxides of the rare earths, for example cerium, lanthanum and neodymium, and thorium oxide, the preferred promoter being cerium oxide. The amount of such promoters used is in the range of from 0.5 to 20% by weight and preferably 0.5 to 3% by weight; they can be used alone or in admixture. When such rare earth oxides are present from 0.5 to 20% by weight, the cobalt oxide or bismuth oxide is present from 80–99.5% by weight. The cobalt oxide is preferably present from 95–99% by weight.

The catalytic compositions may also contain at least one metal oxide selected from the group consisting of the oxides of manganese, iron, magnesium, chromium, and niobium, preferably iron and/or chromium oxides; the amount of such metal oxides used will be such that they constitute from 0.5 to 19.5% by weight of the composition.

DESCRIPTION OF PREFERRED EMBODIMENTS

The catalytic compositions of the invention are prepared in such a manner that the final product has a very particular structure which has been found to be especially advantageous in the catalytic reactions. It is critical that the main constituent, be it cobalt or bismuth, be taken in the form of nitrate for the starting material. Any of the promoters and other oxides to be used may also be added in the form of nitrates. The rare earth metals or thorium are preferably added as nitrates, particularly cerium. Manganese may be added as a powder oxide and chrome may be added as chromic acid dissolved in a little water. The metals other than rare earth metals and thorium may be added also as carbonates or acids dissolved in a little water. The amount of water should be at least that amount necessary to dissolve the acid or carbonate.

To prepare the catalyst, the components to be added as nitrates, including the cobalt or bismuth, are first melted between 60° and 110° C and agitated to mix the various constituents in the liquid. Those minor components to be added in the form of oxides, carbonates or acids are then added to the liquid and mixed. The whole is then heated to 200°–700° C, preferably approximately 700° C, to directly decompose the nitrates by heat into the form of oxides. In particular, when cobalt is used, cobalt oxide of the formula $Co_3O_4$ will be formed substantially into a spinel structure of the formula $Co_3O_4$. Preferably, when the composition contains iron, magnesium or niobium oxides, these components are introduced in the melting step as nitrates, when the composition contains manganese oxide, the component is added after the initial melting step as a powdered oxide, and when the composition contains chromium oxide, the component is added after the initial melting step as an aqueous solution of chromic acid.

It has been determined that the structure of $Co_3O_4$ formed contains $Co^{IV}$ so that its formula is $(Co^{IV}Co_2^{II})O_4$ which is comparable to the spinel structure of $(Ti^{IV}Fe_2^{II})O_4$.

The decomposition product is in the form of a hard compact mass. Granulation is next effected and the catalyst can be used as it is or formed or shaped according to known techniques. The specific surface of the final product is 12 to 100 m²/g.

The catalytic compositions of the invention are especially suitable for the oxidation of ammonia in a solid bed. Such a process for the oxidation of ammonia is particularly useful when the reaction mixture, which consists of ammonia and air whereof the ammonia to ammonia and air ratio is between 0.05 and 0.12, is passed at a high volumetric velocity, which is between 20,000 and 200,000 N liters/hour per liter of catalyst, and under an absolute pressure ranging from 1 to 20 bars, at a mixture temperature of the order of 50° to 200° C over a catalytic composition in accordance with the invention. In a modification of this process, the air used in the mixture is enriched with oxygen.

The employment of the catalytic compositions of the invention in a solid bed permits the utilization of reactor tubes of small diameter, in replacement of the conventional reactors.

The qualities, notably in respect of mechanical strength and hardness, of the catalytic compositions also render them valuable in the catalytic oxidation of ammonia in a fluidized bed. The process employing a fluidized bed is advantageously effected under pressures which can be as high as 20 bars. The reaction mixture is passed into a catalytic composition according to the invention which is in the form of catalytic particles, the grain size of which ranges between 50 and 700 microns, at a temperature ranging between 50° and 200° C, the volumetric velocity on the fluidized bed being in the range of from 50 to 2000 N liters per hour per liter of catalyst. The ratio of ammonia to ammonia and air, optionally enriched with oxygen, in the mixture should again be in the range 0.05 to 0.12.

For a better understanding of the invention, reference will now be made to the following Examples which illustrate, and do not indicate the limits of, the invention.

EXAMPLE 1

Catalyst $A_1$, whose final composition in the oxide form is given below, is formed by melting together the Co and the Ce in the form of nitrates at 80° C. The Nd and Mn oxides are then added in the form of finely-divided powder oxides. The whole is agitated to homogenize it thoroughly, then the liquid is raised to 700° C until the nitrates decompose. The solid obtained is in the form of a hard compact mass. For catalyst $A_2$, whose final composition in the form of oxides is given below, the Co, Ce, and Fe are melted together in the form of nitrates at 80° C. The Nd and Mn are then added in the form of finely-divided powder oxides. The Cr is introduced in the form of liquid chromic acid. The whole is agitated to homogenize it thoroughly, then the liquid is raised to 700° C until the nitrates decompose. The solid obtained is in the form of a hard compact mass. The specific surface, after reaction of product $A_1$, was 24 m²/g and $A_2$ = 37 m²/g. Each product was granulated and shaped in this manner.

| Composition $A_1$ | | Composition $A_2$ | |
|---|---|---|---|
| $Co_3O_4$ | 93% by weight | $Co_3O_4$ | 88% by weight |
| $Ce_2O_3$ | 3% " | $Ce_2O_3$ | 3% " |
| $Nd_2O_3$ | 3% " | $Nd_2O_3$ | 3% " |
| $Mn_3O_4$ | 1% " | $Mn_3O_4$ | 3% " |
| | | $Cr_2O_3$ | 2% " |
| | | $Fe_3O_4$ | 1% " |

Catalyst composition $A_1$ was charged into a tubular reactor provided with a temperature exchanger which permitted one to maintain the catalyst bed at predetermined temperatures. A mixture of ammonia and air was preheated to a temperature of 100° C, and then fed to the inlet of the reactor. At the outlet of the reaction, a proportion of the gases had been converted to $NO_2$ and the result obtained was recorded as the yield of ammonia converted, expressed as a percentage.

The test was repeated with the process conditions altered, and the results of these tests are shown in Table I below.

TABLE I

| Test No | VVH | $NH_3/(NH_3 + air)$ | P bars | Temperature of mixture | Temperature of catalyst | | | Yield % by weight |
|---|---|---|---|---|---|---|---|---|
| | | | | | TE | TM | TS | |
| 1 | 50,000 | 0.096 | 1 | 100°C | 772 | 775 | 780 | 93 |
| 2 | 100,000 | 0.096 | 1 | 100°C | 772 | 775 | 780 | 95 |
| 3 | 150,000 | 0.096 | 1 | 100°C | 772 | 775 | 780 | 94 |
| 4 | 200,000 | 0.096 | 1 | 100°C | 772 | 775 | 780 | 89 |
| 5 | 10,000 | 0.096 | 1 | 100°C | 772 | 775 | 780 | 93 |

P = absolute pressure in bars; TE = inlet temperature in ° C, TM = temperature at middle in ° C, TS = outlet temperature in ° C; VVH = the volumetric velocity, i.e. the ratio of the flow rate of the gaseous mixture ($NH_3$ + air) in Nl/h to the volume of the catalyst expressed in liters; the ratio $NH_3/(NH_3 + air)$ is the ratio of the gaseous flow rate of $NH_3$ in Nl/h to the flow rate of the gaseous mixture ($NH_3$ + air) in Nl/h; and the yield % by weight is the percentage of the inflowing ammonia converted to $NO_2$.

EXAMPLE 2

The catalytic composition $A_1$ was tested in the same reactor as in Example 1 under pressures higher than atmospheric pressure. The results obtained from this series of tests are shown in Table II. The mixture of ammonia and air was preheated to a temperature of 65° C.

TABLE II

| Test No | VVH | $NH_3/(NH_3 + air)$ | P bars | Temperature of catalyst °C TE | TM | TS | Yield % by weight |
|---|---|---|---|---|---|---|---|
| 1 | 200,000 | 0.094 | 7 | 320 | 445 | 800 | 91.8 |
| 2 | 200,000 | 0.094 | 8 | 285 | 375 | 805 | 91.8 |
| 3 | 200,000 | 0.094 | 9 | 350 | 445 | 840 | 90.2 |
| 4 | 200,000 | 0.094 | 10 | 290 | 620 | 835 | 90.0 |

EXAMPLE 3

This example described stability tests carried out on a catalytic composition of the invention. The catalytic composition $A_1$ was withdrawn from the reactor at the end of the series of tests of Example 2. It was brought to a temperature of 900° C in a muffle furnace over a period of one hour. It was then returned to the reactor and employed for a period of 250 hours under the conditions set forth in Table III below. The preheating temperature of the mixture of ammonia and air was 65° C. The temperature of the reaction and the yield exhibited no change during the entire test.

| Duration in hours | VVH | $NH_3/(NH_3 + air)$ | P bars | Temperature of catalyst °C TE | TM | TS | Yield % by weight |
|---|---|---|---|---|---|---|---|
| 250 | 200,000 | 0.094 | 9 | 350 | 445 | 840 | 90.2 |

EXAMPLE 4

| Test No | Duration hours | VVH | $NH_3/(NH_3 + air)$ | P bars | Temperature of Mixture °C | Temperature of catalyst °C TE | TM | TS | Yield % by Weight |
|---|---|---|---|---|---|---|---|---|---|
| 1 | 130 | 23,000 | 0.0987 | 3.4 | 100 | 765 | 768 | 775 | 94.3 |
| 2 | 239 | 42,000 | 0.0994 | 3.4 | 102 | 783 | 785 | 795 | 96.20 |

This example records the results of tests effected in a fluidized bed in contact with particles of catalytic composition $A_1$ having a grain size of approximately 600 microns, under an absolute pressure of 2 bars.

TABLE IV

| Test No | VVH | $NH_3/(NH_3 + air)$ | P bars | Temperature of catalyst °C | Yield % by weight |
|---|---|---|---|---|---|
| 1 | 70 | 0.092 | 2 | 680 | 94 |
| 2 | 400 | 0.092 | 2 | 550 | 90.3 |

EXAMPLE 5

Catalyst $A_3$, whose final composition in the form of oxides is given below, was prepared in the same manner as example 1. The Co and Ce are in the form of nitrates and they are melted at 80° C. The liquid is agitated to mix it well then raised to 700° C until the nitrates decompose. The solid obtained is in the form of a hard compact mass. The solid was then granulated to a size of 3 to 6 mm.

| | Composition $A_3$ |
|---|---|
| $Co_3O_4$ | 97.8% by weight |
| $Ce_2O_3$ | 2.2% by weight |

The catalyst was introduced into an industrial pilot plant comprising a solid catalytic bed 500 mm in diameter and suitable for processing a flow rate of a mixture of ammonia and air which can be varied between approximately 300 and 700 $Nm^3/h$.

The results obtained are shown in Table V below:

TABLE V

EXAMPLE 6

| | Composition $A_4$ |
|---|---|
| $Bi_2O_3$ | 97% by weight |
| $Ce_2O_3$ | 3% |

The components of catalyst $A_4$, whose final composition in the form of an oxide is given above, are melted together in the form of Bi and Ce nitrates at 80° C. The liquid is agitated to mix it well then raised to 700° C until the nitrates decompose. The solid obtained, in the form of a hard compact mass, is granulated to a size of 3 to 6 mm. The catalyst so obtained was tested under the same conditions as in Example 1 at atmospheric pressure. The results are shown in Table VI.

TABLE VI

| Test No. | VVH | $NH_3/NH_3 + air$ | P bars | Mixing temp. °C | Cat. temp. °C TE | Cat. temp. °C TM | Cat. temp. °C TS | Yield % wt. |
|---|---|---|---|---|---|---|---|---|
| 1 | 50,000 | 0.096 | 1 | 100 | 780 | 788 | 792 | 92 |
| 2 | 100,000 | 0.096 | 1 | 100 | 780 | 788 | 792 | 90 |

However, after a certain period of operation, the bismuth oxide migrates to the surface of the catalyst and is entrained by the gas flow. This disadvantage does not exist with cobalt oxide.

It will be obvious to those skilled in the art that various changes may be made without departing from the scope of the invention and the invention is not to be considered limited to what is described in the specification.

What is claimed:

1. A catalyst composition suitable for use in the catalytic oxidation of ammonia to oxides of nitrogen, comprising:
   80–99.5% by weight of $Co_3O_4$ is substantially a spinel $(Co^{IV}Co^{II}_2)O_4$ structure;
   0.5–20% by weight of at least one of the oxides of the group of metals consisting of the rare earths and thorium; and
   0.5–19.5% by weight of at least one further oxide selected from the group consisting of the oxides of manganese, iron, magesium, chromium and niobium,
   said catalytic composition having a specific surface ranging from 12 to 100 m²/g.

2. A catalytic composition in accordance with claim 1, wherein said oxide of the group consisting of the rare earths and thorium includes cerium oxide.

3. A catalytic composition in accordance with claim 1, wherein said oxide of the group consisting of the rare earths and thorium is present in an amount of 0.5-3% by weight.

4. A catalytic composition in accordance with claim 1, wherein said composition includes iron or chromium oxide as one of said further oxides.

5. A catalytic composition in accordance with claim 1, wherein said $Co_3O_4$ is present in the range of 95–99%.

6. A method of preparing a catalytic composition having 80–99.5% by weight $Co_3O_4$ in substantially a spinel $(Co^{IV}Co^{II}_2)O_4$ structure and 0.5–20% by weight of at least one of the oxides of the group of metals consisting of the rare earths and thorium, said catalytic composition having a specific surface of 12–100 m²/g, comprising the steps of:

melting a sufficient amount of cobalt nitrate to form the desired amount of $Co_3O_4$ along with at least one of the additional components in the form of nitrate at 60°–110° C;

adding any remaining components, each in the form of a powdered oxide or an aqueous solution of carbonate or acid; and heating at 200°–700° C to decompose said nitrates and obtain a solid residue of said catalytic composition.

7. A process in accordance with claim 6, wherein said heating step is to a temperature of approximately 700° C.

8. A process in accordance with claim 6 wherein all of said components are introduced in said melting step in the form of nitrates.

9. A process in accordance with claim 6, wherein said catalytic composition further contains 0.5–19.5% by weight of at least one oxide of manganese, iron, magnesium, chromium and niobium.

10. A process in accordance with claim 9 wherein, when said composition contains iron, magnesium or niobium oxides, the components are introduced in said melting step as nitrates; when said composition contains manganese oxide the component is added in said adding step as a powdered oxide; and when said composition contains chromium oxide the component is added in said adding step as an aqueous solution of chromic acid.

11. A process in accordance with claim 6, further including the step of shaping the product of said heating step.

12. A process in accordance with claim 6, further including the step of mixing the product of said melting step prior to said heating step.

13. A catalytic composition in accordance with claim 1 wherein said oxides of the group of metals consisting of the rare earths and thorium are oxides of cerium, neodymium, lanthanum or thorium.

14. A process in accordance with claim 6 wherein said oxides of the group of metals consisting of the rare earths and thorium are oxides of cerium, neodymium, lanthanum or thorium.

* * * * *